United States Patent
Chi et al.

(10) Patent No.: US 11,759,748 B1
(45) Date of Patent: Sep. 19, 2023

(54) AUTOMATED CONTINUOUS PURIFICATION SYSTEM

(71) Applicant: NATIONAL TSING HUA UNIVERSITY, Hsinchu (TW)

(72) Inventors: Yu-Hsuan Chi, Hsinchu (TW); I-Wei Chen, Hsinchu (TW); Jen-Huang Huang, Hsinchu (TW); Cheng Hsian Wu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 17/813,045

(22) Filed: Jul. 18, 2022

(30) Foreign Application Priority Data

Mar. 8, 2022 (TW) .................................. 111108431

(51) Int. Cl.
  *B01D 61/10* (2006.01)
  *G01N 30/24* (2006.01)
  (Continued)

(52) U.S. Cl.
  CPC ........... *B01D 61/025* (2013.01); *B01D 61/08* (2013.01); *B01D 61/10* (2013.01); *G01N 30/24* (2013.01);
  (Continued)

(58) Field of Classification Search
  CPC ........ B01D 61/08; B01D 61/10; B01D 61/12; B01D 15/1871; F16K 15/18; F16K 7/12;
  (Continued)

(56) References Cited

U.S. PATENT DOCUMENTS

| 4,068,528 A * | 1/1978 | Gundelfinger ......... G01N 30/20 73/864.84 |
| 2013/0174927 A1* | 7/2013 | Wan ................... G01N 35/1097 137/625.15 |
| 2021/0382018 A1 | 12/2021 | Otsubo et al. |

FOREIGN PATENT DOCUMENTS

| CN | 100399021 C | 7/2008 |
| CN | 104395748 B | 9/2017 |
| TW | 200932916 A | 8/2009 |

OTHER PUBLICATIONS

Yu-Hsuan Chi, "Develop an Automated Platform and a Microfluidic-Based Valve Controlling System for Continuous Protein Purification on Multi-Columns", Graduation Thesis Oral Defense for master's degree of Department of Chemical Engineering, National Tsing Hua University, dated on Jul. 19, 2021, oral presentation, Taiwan, R.O.C.

* cited by examiner

*Primary Examiner* — Pranav N Patel
(74) *Attorney, Agent, or Firm* — CKC & Partners Co., LLC

(57) ABSTRACT

An automated continuous purification system includes a base and a plurality of purifying elements. The base includes a first flowing channel layer, a steering valve, a plurality of second flowing channel layers, a plurality of third flowing channel layers and a top layer. The first flowing channel layer includes a plurality of first flowing channels. The steering valve is disposed on a side of the first flowing channel layer and includes a plurality of through-holes. The second flowing channel layers are disposed on a side of the steering valve away from the first flowing channel layer. The third flowing channel layers are alternately stacked with the second flowing channel layers, and each of the third flowing channel layers is disposed on a side of each of the second flowing channel layers away from the steering valve. The (Continued)

top layer includes a plurality of inlets and a plurality of outlets.

13 Claims, 12 Drawing Sheets

(51) Int. Cl.
*B01D 61/02* (2006.01)
*B01D 61/08* (2006.01)
*G01N 30/46* (2006.01)
*F16K 11/00* (2006.01)
*G01N 30/80* (2006.01)

(52) U.S. Cl.
CPC .............. *F16K 11/00* (2013.01); *G01N 30/46* (2013.01); *G01N 30/80* (2013.01)

(58) Field of Classification Search
CPC ............. G01N 2030/208; G01N 30/10; G01N 30/461; G01N 30/463; G01N 30/466; G01N 30/465; G01N 30/6039; G01N 30/80

See application file for complete search history.

AUTOMATED CONTINUOUS PURIFICATION SYSTEM

RELATED APPLICATIONS

This application claims priority to Taiwan Application Serial Number 111108431, filed Mar. 8, 2022, which is herein incorporated by reference.

BACKGROUND

Technical Field

The present disclosure relates to an automated continuous purification system. More particularly, the present disclosure relates to a portable and maneuverable automated continuous purification system.

Description of Related Art

In chemical, pharmaceutical, or biological related fields, purification technology has been essential for determining product quality. Though purification technology nowadays is mature, it still conventionally requires manual operation or batch purification. Moreover, if a process error occurs due to negligent human operation, the entire batch of products must be directly destroyed, thereby increasing production pressure and costs.

Although commercialized purification systems have appeared on the market, their volume is typically bulky, making them challenging to be connected in series with the upstream product synthesis process. Moreover, their operations are so complicated that it is prone to human negligence and therefore cannot completely solve the problems mentioned above.

In conclusion, developing a portable and maneuverable automated continuous purification system has its practical value in related industries.

SUMMARY

According to one aspect of the present disclosure, an automated continuous purification system includes a base and a plurality of purifying elements. The base includes a first flowing channel layer, a steering valve, a plurality of second flowing channel layers, a plurality of third flowing channel layers and a top layer. The first flowing channel layer includes a plurality of first flowing channels. The steering valve is disposed on a side of the first flowing channel layer, the steering valve includes a plurality of through-holes, and each of the first flowing channels is communicated with at least one of the through-holes of the steering valve. The second flowing channel layers are disposed on a side of the steering valve away from the first flowing channel layer, wherein each of the second flowing channel layers includes a plurality of second flowing channels, and at least one of the second flowing channels of each of the second flowing channel layers is communicated with at least one of the through-holes of the steering valve. The third flowing channel layers are alternately stacked with the second flowing channel layers, and each of the third flowing channel layers is disposed on a side of each of the second flowing channel layers away from the steering valve, wherein each of the third flowing channel layers includes at least one third flowing channel, and the at least one third flowing channel of each of the third flowing channel layers is communicated with the second flowing channels of each of the second flowing channel layers. The top layer is disposed on a side of the second flowing channel layers and the third flowing channel layers away from the steering valve, and the top layer includes a plurality of inlets and a plurality of outlets. The inlets are respectively communicated with one of the first flowing channels, and the outlets are respectively communicated with the at least one third flowing channel of one of the third flowing channel layers. The purifying elements are respectively pipe-connected to one of the outlets. The steering valve is driven and then rotated by a first force so that each of the through-holes is communicated with another one of the second flowing channels.

BRIEF DESCRIPTION OF THE DRAWINGS

The present disclosure can be more fully understood by reading the following detailed description of the embodiment, with reference made to the accompanying drawings as follows:

FIG. 30 is a diagram showing a flowing channel arrangement in a state after the steering valve of the example of FIG. 1 driven twice by the first force.

DETAILED DESCRIPTION

Figure 1:
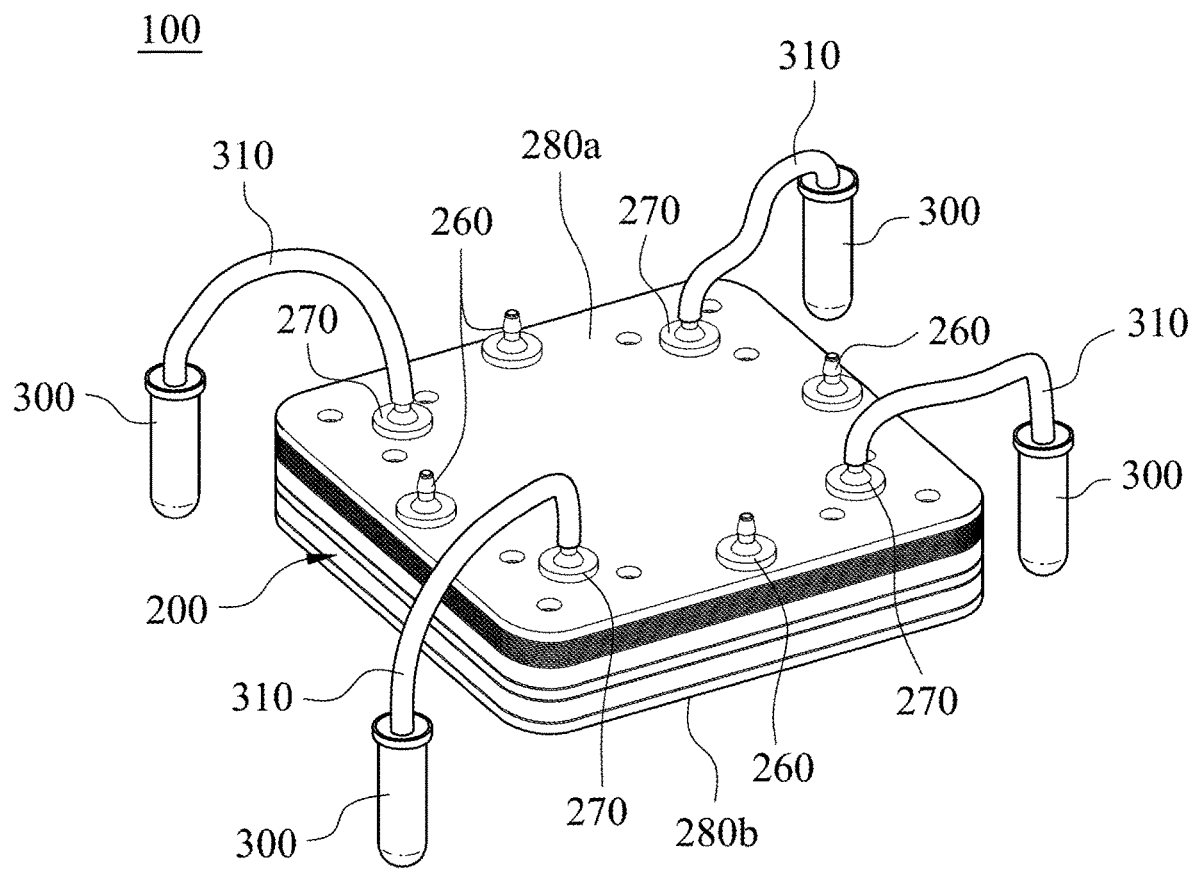
FIG. 1 is a three-dimensional view of an automated continuous purification system according to one example of one embodiment of the present disclosure.

The present disclosure will be further exemplified by the following specific embodiments. However, the embodiments can be applied to various inventive concepts and can be embodied in various specific ranges. The specific embodiments are only for the purposes of description, and are not limited to these practical details thereof. Furthermore, in order to simplify the drawings, some conventional structures and elements will be illustrated in the drawings by a simple and schematic way.

Figure 2A:
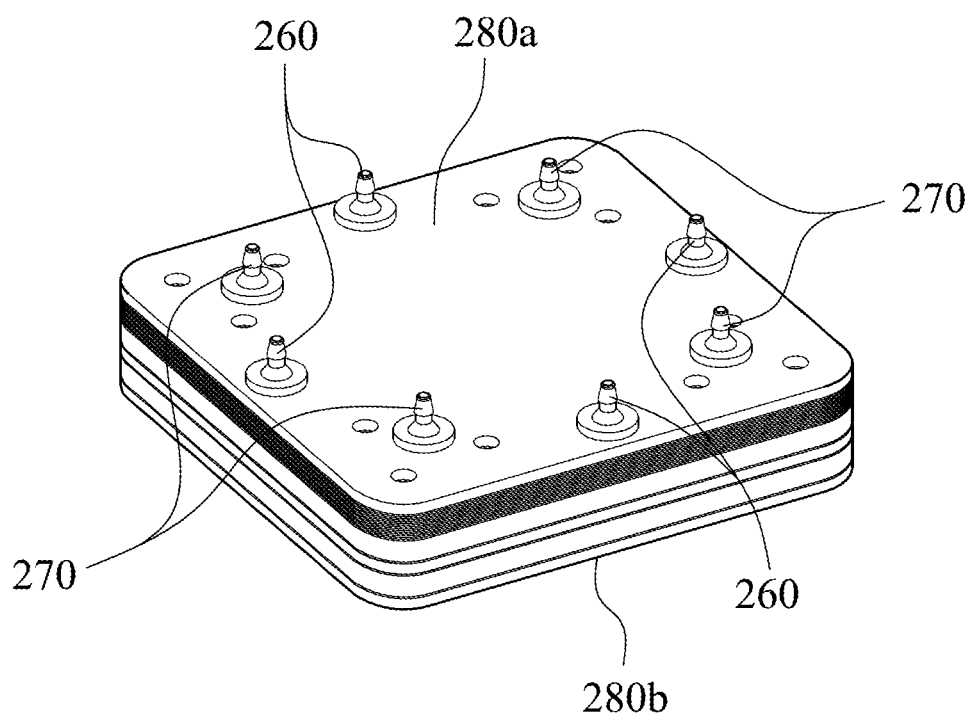
FIG. 2A is a three-dimensional view of a base of the example of FIG. 1.
Figure 2B:
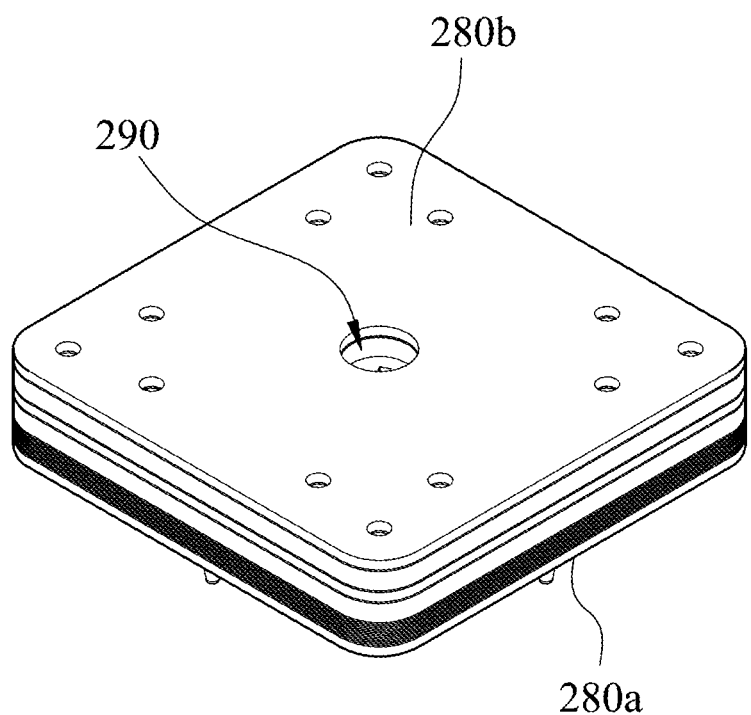
FIG. 2B is another three-dimensional view of the base of the example of FIG. 1.
Figure 2C:
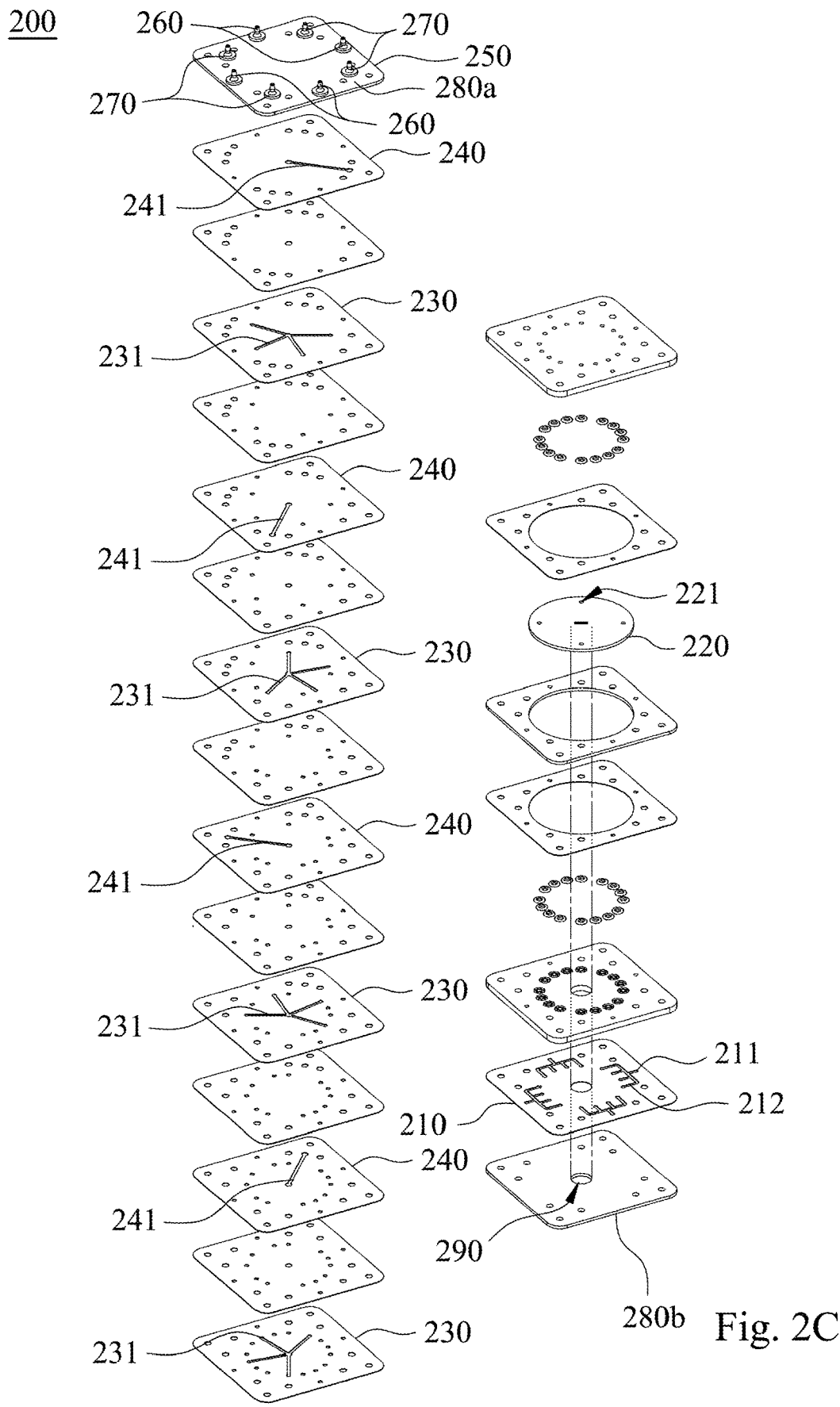
FIG. 2C is an exploded view of the base of the example of FIG. 1.

Please refer to FIGS. 1, 2A, 2B and 2C. FIG. 1 is a three-dimensional view of an automated continuous purification system 100 according to one example of one embodiment of the present disclosure. FIG. 2A is a three-dimensional view of a base 200 according to the example of FIG. 1. FIG. 2B is another three-dimensional view of the base 200 according to the example of FIG. 1. FIG. 2C is an exploded view of the base 200 of the example of FIG. 1.

In FIGS. 1 to 2C, the automated continuous purification system 100 includes the base 200 and a plurality of purifying elements 300. The base 200 includes a first flowing channel layer 210, a steering valve 220, a plurality of second flowing channel layers 230, a plurality of third flowing channel layers 240, and a top layer 250. The first flowing channel layer 210 includes a plurality of first flowing channels 211. The steering valve 220 is disposed on a side of the first flowing channel layer 210, the steering valve 220 includes a plurality of through-holes 221, and each of the first flowing channels 211 is communicated with at least one of the through-holes 221 of the steering valve 220. The second flowing channel layers 230 are disposed on a side of the steering valve 220 away from the first flowing channel layer 210, wherein each of the second flowing channel layers 230 includes a plurality of second flowing channels 231, and at least one of the second flowing channels 231 of each of the second flowing channel layers 230 is communicated with at least one of the through-holes 221 of the steering valve 220. The third flowing channel layers 240 are alternately stacked with the second flowing channel layers 230, and each of the third flowing channel layers 240 is disposed on a side of each of the second flowing channel layers 230 away from the steering valve 220, wherein each of the third flowing channel layers 240 includes at least one third flowing channel 241, and the at least one third flowing channel 241 of each of the third flowing channel layers 240 is communicated with the second flowing channels 231 of each of the second flowing channel layers 230. The top layer 250 is disposed on a side of the second flowing channel layers 230 and the third flowing channel layers 240 away from the steering valve 220, and the top layer 250 includes a plurality of inlets 260 and a plurality of outlets 270. In FIG. 2A, all of the inlets 260 and the outlets 270 project from the surface 280a of the base 200 for connecting with other elements preferably, but the present disclosure is not limited thereto. The inlets 260 are respectively communicated with one of the first flowing channels 211. The outlets 270 are respectively communicated with the at least one third flowing channel 241 of one of the third flowing channel layers 240. The purifying elements 300 are respectively pipe-connected to one of the outlets 270. In particular, the purifying elements 300 and the outlets 270 can be connected by pipes 310, but the present disclosure is not limited thereto. The steering valve 220 can be driven and then rotated by a first force so that each of the through-holes 221 is communicated with another one of the second flowing channels 231.

In detail, after the fluid flows into the first flowing channels 211 of the first flowing channel layer 210 through one of the inlets 260, the fluid will flow through one of the through-holes 221 of the steering valve 220 communicated to the first flowing channels 211 to enter the second flowing channel layer 230 corresponding and flow into the second flowing channel 231 thereof. The fluid enters the third flowing channel layer 240 corresponding and flows into the third flowing channel 241 thereof, and finally flows out from the outlet 270 corresponding and is directed to the purifying element 300 corresponding. When the steering valve 220 is driven to rotate and displace by the aforementioned first force, the through-holes 221 of the steering valve 220 rotate and displace accordingly and are communicated to another one of the second flowing channels 231. After the steering valve 220 rotates and displaces, the fluid will eventually flow out from another one of the outlets 270 and be directed to another one of the purifying elements 300, thereby reaching the purpose of performing the purification steps for changing the flowing channels and the purifying elements 300. In FIG. 2C, the base 200 is designed with multi-layer and three-dimensional flowing channels so that the fluid flows in each of the flowing channels in the way above. Therefore, compared with the conventional purification system, the base 200 of the automated continuous purification system 100 of the present disclosure has a smaller volume.

More specifically, the base 200 can further include a plurality of water blocking elements (its reference numeral is omitted), the water blocking elements can be disposed between each of the layers of the base 200, and the water blocking elements can be waterproof O-rings or water blocking plates with holes, thereby preventing fluid from leakage or flowing into the wrong flowing channel when fluid is flowing in the base 200, but the present disclosure is not limited thereto.

To enable the steering valve 220 can be driven to rotate and displace by an external force, the automated continuous purification system 100 can further include a motor (not shown), which is connected to the steering valve 220 and is for providing the aforementioned first force. The motor can be a step motor so that the steering valve 220 can be rotated at a slight angle, but the present disclosure is not limited thereto. More specifically, in FIG. 2B, the surface 280b of the base 200 can further include a concave hole 290. The motor can be connected to the steering valve 220 via the concave hole 290 for providing the first force to drive the steering valve 220 to rotate and displace, but the present disclosure is not limited thereto.

In practical application, the automated continuous purification system 100 can further include a plurality of fluid storage tanks (not shown), and the fluid storage tanks are respectively pipe-connected to one of the inlets. Each of the fluid storage tanks can be used on containing various fluids required for the purification process. In detail, there are usually four steps required for a protein purification process: an adsorption step, a washing step, an elution step, and a re-equilibration step. Each of the fluid storage tanks can be used to hold the fluid required for each step, so that the fluid corresponding can be available when the automated continuous purification system 100 operates. Furthermore, since the base 200 can have a three-dimensional and vertically upward flowing channel design, the fluid used needs to be pressurized to flow upward in the base 200 smoothly, the automated continuous purification system 100 can further include a plurality of driving sources (not shown), and the fluid storage tanks are respectively pipe-connected to the inlets 260 through the driving sources. For example, a pipeline (not shown) can connect the fluid storage tank to one of the inlets 260 through a driving source so as to pressurize the fluid flowing out of the fluid storage tank, but the present disclosure is not limited thereto. Therefore, the fluid flowing into the base 200 can have sufficient pressure to flow smoothly in the base 200. The driving source can be a pump, preferably, the driving source can be a peristaltic pump, a syringe pump, or a diaphragm pump, but the present disclosure is not limited thereto.

Please refer to FIG. 2C again, each of the first flowing channels 211 can further include a plurality of first flowing sub-channels 212, and each of the first flowing channels 211 is communicated with at least one of the through-holes 221 of the steering valve 220 via at least one of the first flowing sub-channels 212, so as to precisely control the fluid flow to the second flowing channel layer 230 corresponding and into the second flowing channel 231 thereof. More specifically, in FIG. 2C, one of the first flowing channel 211 corresponds to one of the through-holes 221, that is, in each of the first flowing channels 211 at the same time, only one of the first flowing sub-channels 212 communicates with the second flowing channel layer 230 corresponding and the second flowing channel 231 thereof through the through-holes 221, but the present disclosure is not limited thereto.

Furthermore, in the automated continuous purification system 100, a number of the first flowing sub-channels 212 of each of the first flowing channels 211, a number of the through-holes 221, a number of the second flowing channel layers 230, a number of the second flowing channels 231 of each of the second flowing channel layers 230, a number of the third flowing channel layers 240, a number of the outlets 270 and a number of the purifying elements 300 can be more than or equal to a number of the inlets 260 and a number of the first flowing channels 211. In FIG. 2C, the number of the first flowing channels 211, the number of the first flowing sub-channels 212 of each of the first flowing channels 211, the number of the through-holes 221, the number of the second flowing channel layers 230, the number of the second flowing channels 231 of each of the second flowing channel layers 230, the number of the third flowing channel layers 240, the number of the inlets 260, the number of the outlets 270 and the number of the purifying elements 300 are four, respectively, but the present disclosure is not limited thereto.

More specifically, in the automated continuous purification system 100, both of the number of the first flowing channels 211 and the number of the inlets 260 correspond to a number of the steps required for the purification process. For example, the automated continuous purification system 100 has four first flowing channels 211 and four inlets 260, which means that the automated continuous purification system 100 can perform a purification process with a maximum number of four steps (as the aforementioned protein purification system), and the fluids required in each step flow into each one of the first flowing channels 211 through each of the inlets 260 corresponding, respectively, and pass through the through-holes 221, the second flowing channel 231, the third flowing channels 241, the outlet 270, and finally flow into the purifying element 300 corresponding for performing the purification process, but the present disclosure is not limited to the maximum number of steps thereto. In other examples, the automated continuous purification system of the present disclosure can be applied to other purification processes with a different number of steps, or to increase the number of products obtained in a single purification process by simply adjusting the number of components of the automated continuous purification system of the present disclosure.

For example, when a purification process with a maximum number of steps is five, the number of the inlets, the number of the first flowing channels, the number of the first flowing sub-channels of each of the first flowing channels, the number of the through-holes on the steering valve, the number of the second flowing channel layers, the number of the second flowing channels of each of the second flowing channel layers, the number of the third flowing channel layers, the number of the outlets, and the number of the purifying elements are respectively changed to five accordingly. For doubling the amount of product obtained in the single purification process of the aforementioned protein purification process, the number of the first flowing sub-channels of each of the first flowing channels, the number of the through-holes on the steering valve, and the number of the second flowing channels of each of the second flowing channel layers, and the number of the purifying elements are changed to eight, and the number of the third flowing channels included in each of the third flowing channel layers are changed to two (that is, each of the first flowing channels corresponds to two through-holes and two purifying elements). Therefore, the automated continuous purification system of the present disclosure can be applied to different purification processes by simply changing a number of internal components. The aforementioned change in the number of internal components are only two of the various adjustments, other changes in the number of internal components of the automated continuous purification system of the present disclosure also belongs to the scope of the present disclosure, and the present disclosure is not limited to.

In detail, the automated continuous purification system 100 can further include a spectrometer (not shown) electrically connected to the purifying elements 300 for monitoring the purification process at any time, so that the user can respond in time once any error occurs in the automated continuous purification system 100, and ensure the purification quality as well. Moreover, the automated continuous purification system 100 can further include a temperature control tank (not shown), wherein the purifying elements are accommodated in the temperature control tank to prevent the environmental temperature from affecting the purification quality. Specifically, the purifying elements 300 can be purification columns or purification multilayer membranes, but the present disclosure is not limited thereto.

Figure 3A:
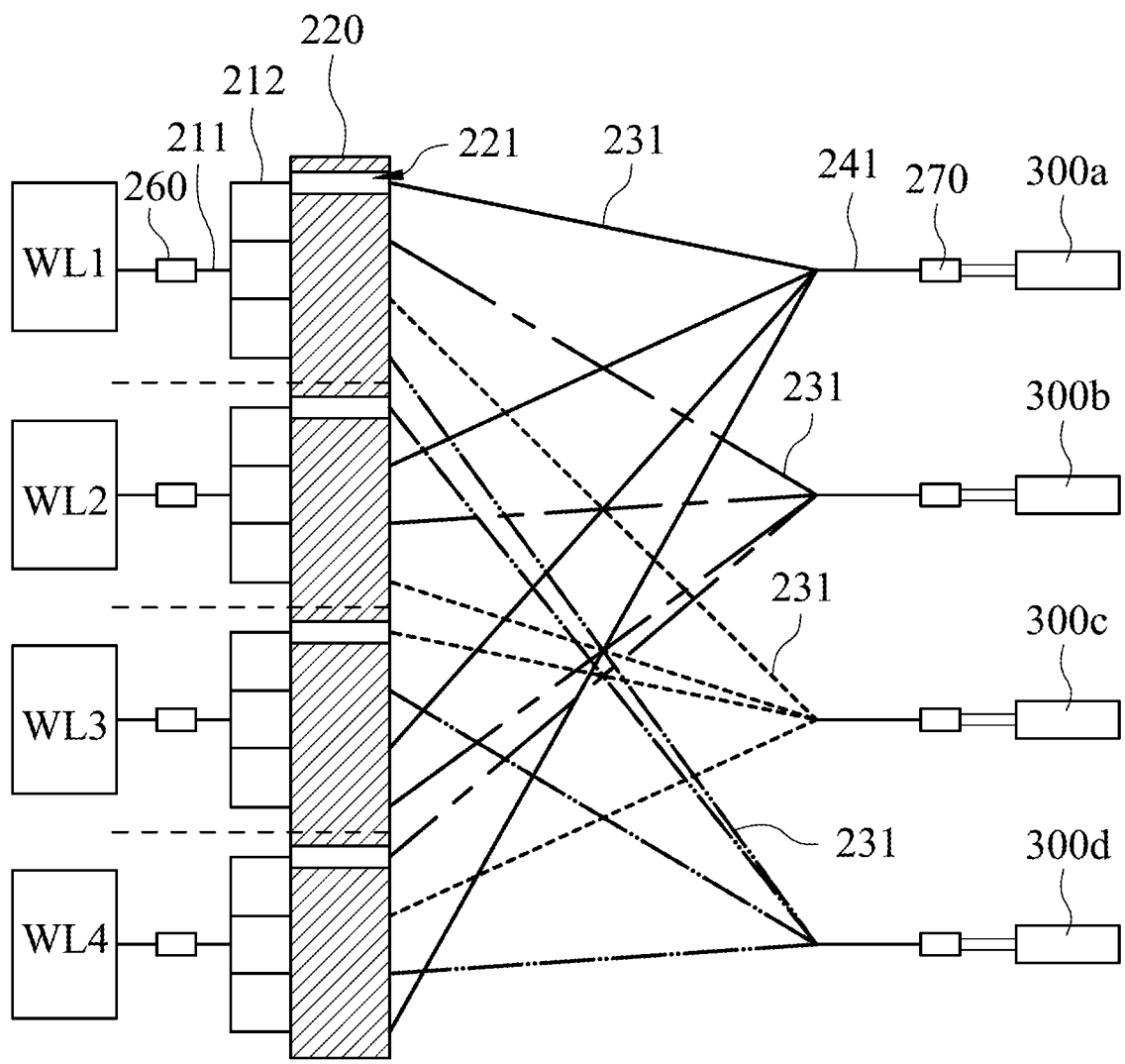
FIG. 3A is a diagram showing a flowing channel arrangement in an initial state of the example of FIG. 1.
Figure 3B:
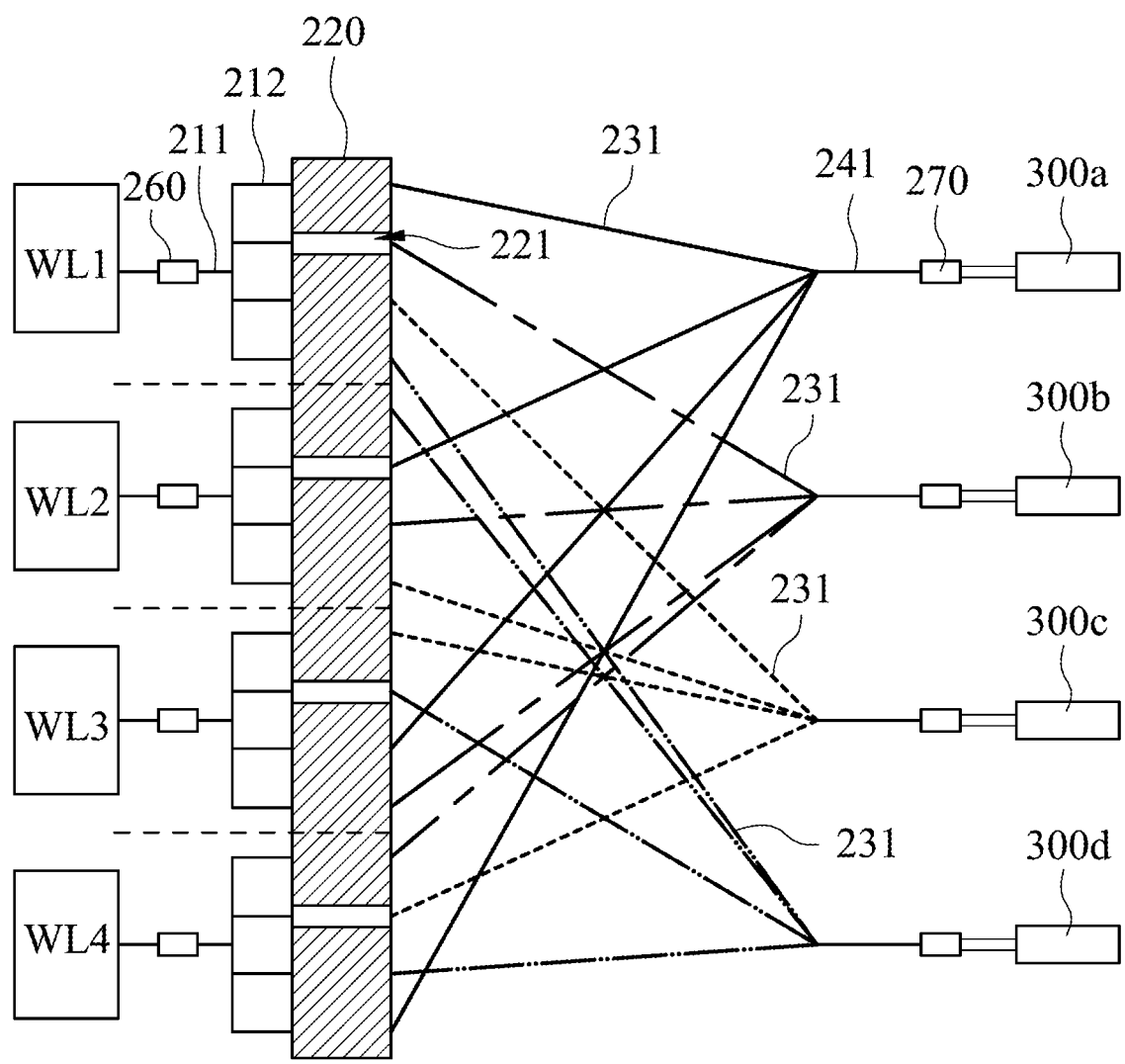
FIG. 3B is a diagram showing a flowing channel arrangement in a state after the steering valve of the example of FIG. 1 driven once by a first force.
Figure 3C:
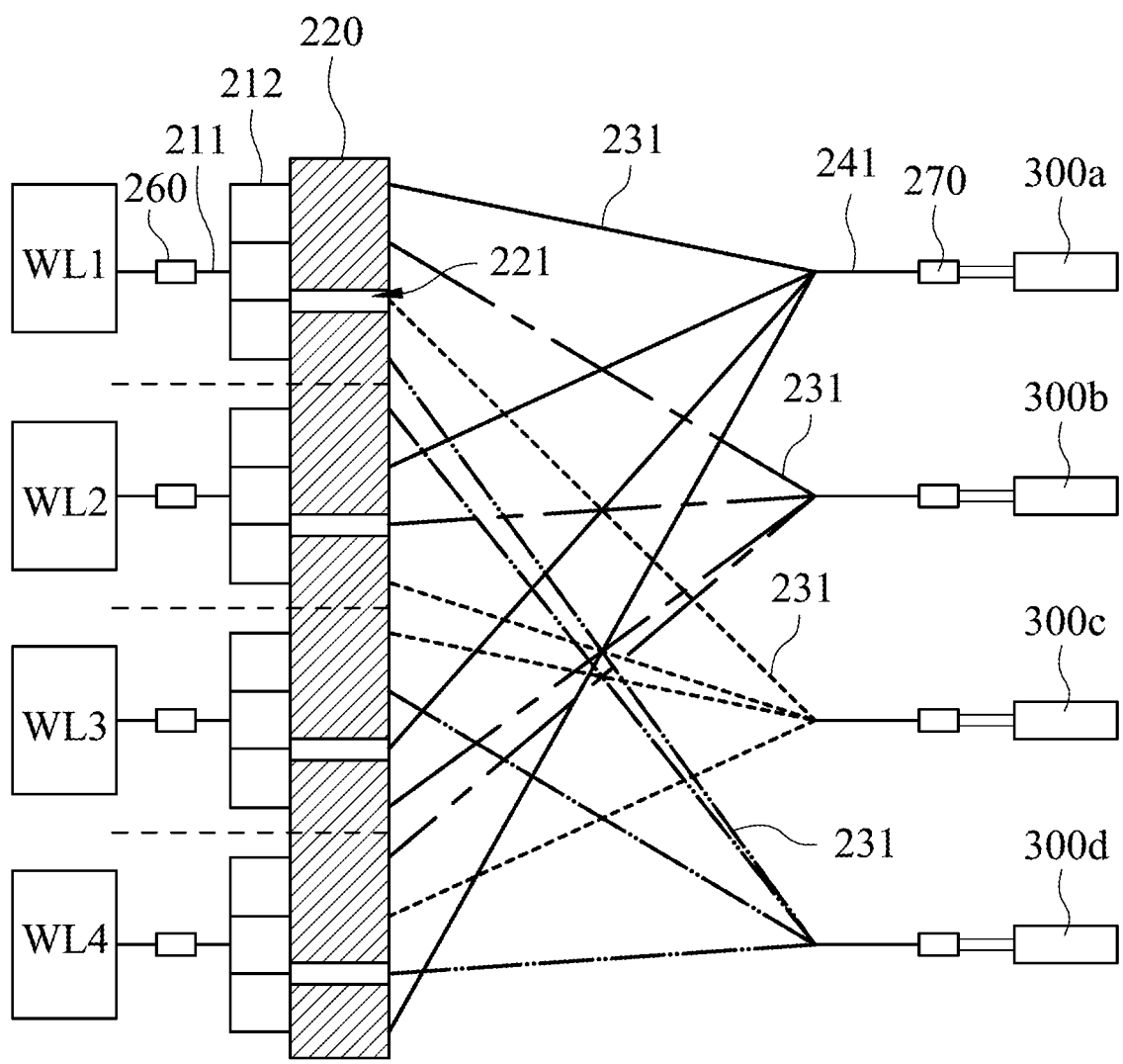
FIG. 3D is a diagram showing a flowing channel arrangement in a state after the steering valve of the example of FIG. 1 driven thrice by the first force.
FIG. 3E is an operation flow diagram of the example of FIG. 1.
Figure 3D:
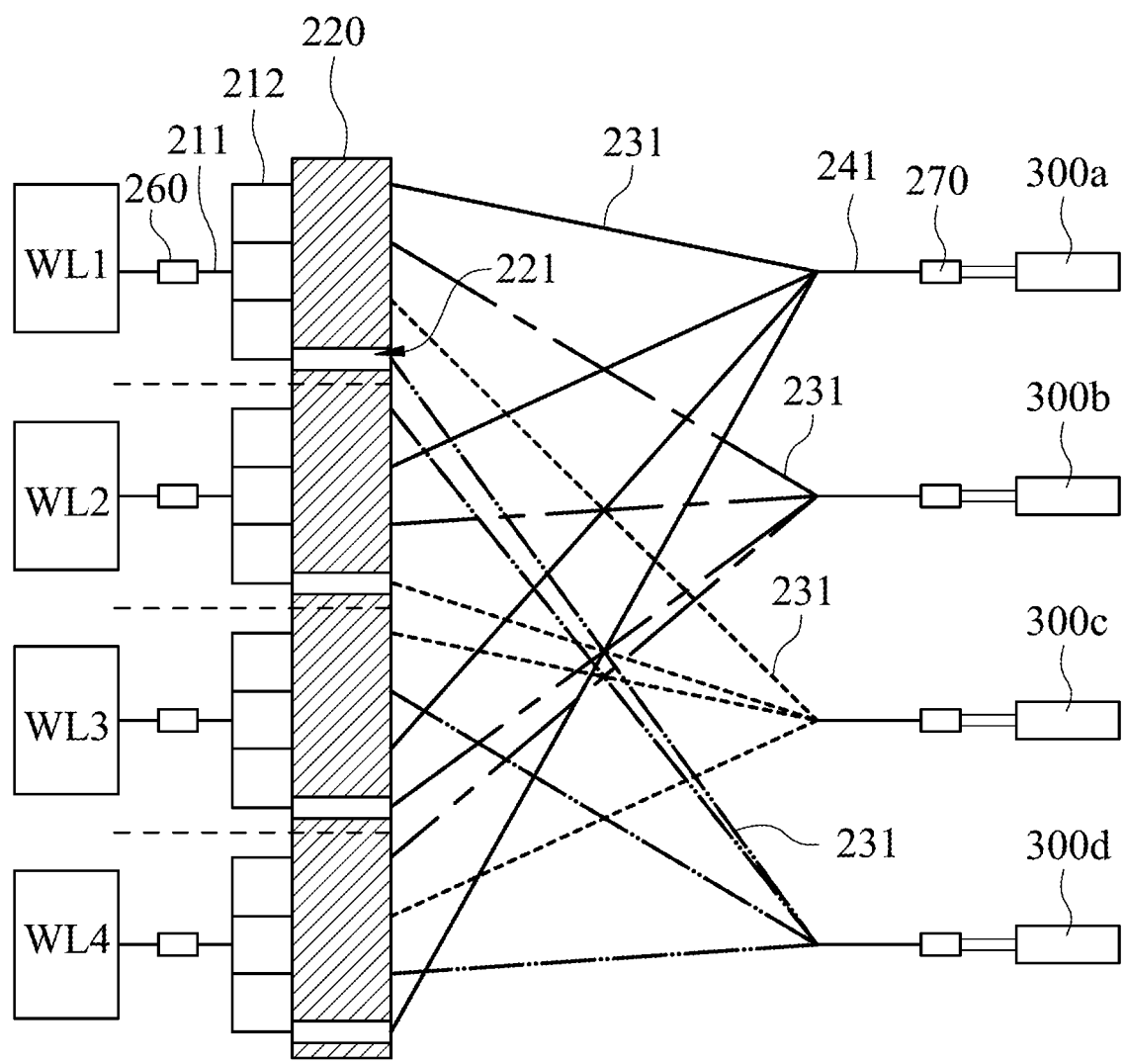
Figure 3E:
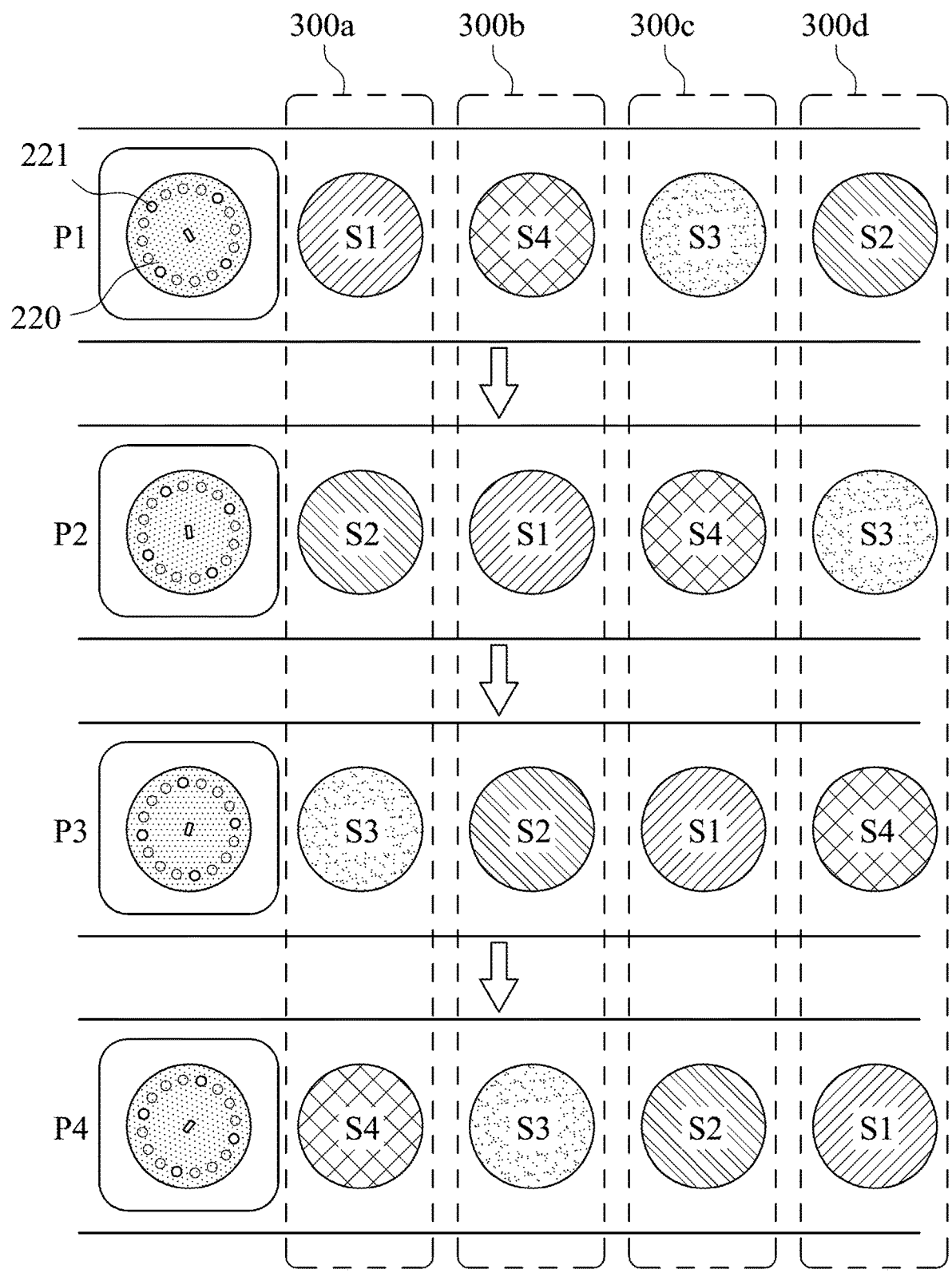

Please refer to FIG. 1 and FIGS. 3A to 3E, FIG. 3A is a diagram showing a flowing channel arrangement in an initial state of the example of FIG. 1, FIG. 3B is a diagram showing a flowing channel arrangement in a state after the steering valve 220 of the example of FIG. 1 driven once by a first force, FIG. 3C is a diagram showing a flowing channel arrangement in a state after the steering valve 220 of the example of FIG. 1 driven twice by the first force, FIG. 3D is a diagram showing a flowing channel arrangement in a state after the steering valve 220 of the example of FIG. 1 driven thrice by the first force, and FIG. 3E is an operation flow diagram of the example of FIG. 1. It should be noted that, in FIGS. 3A to 3D, the second flowing channels 231 with the same marking format are located in the same second flowing channel layer 230 (as shown in FIG. 2C). Moreover, in order to explain the technical details of the present disclosure more clearly, the purifying elements 300 in FIGS. 3A to 3E are respectively numbered as a purifying element 300a, a purifying element 300b, a purifying element 300c, and a purifying element 300d.

The automated continuous purification system 100 has four inlets 260 and four first flowing channels 211. In a protein purification process, the four inlets 260 aforementioned and the four first flowing channels 211 aforementioned are respectively for an inflow of a fluid WL1 for an adsorption step S1, a fluid WL2 for a cleaning step S2, a fluid WL3 for a elution step S3, and a fluid WL4 for a re-equilibration step S4, so that the fluid required for each of the steps will pass through one of the through-holes 221 of the steering valve 220, the second flowing channel layer 230 and the second flowing channel 231 thereof corresponding to the through-hole 221 aforementioned, the third flowing channel layer 240 and the third flowing channel 241 thereof corresponding to the second flowing channel 231 aforementioned, one of the outlets 270 corresponding to the third flowing channel 241 aforementioned, and be piped into the purifying element 300a corresponding, the purifying element 300b corresponding, the purifying element 300c corresponding, and the purifying element 300d corresponding so as to perform each of the steps respectively. When the steering valve 220 is driven by the first force to rotate and displace, the second flowing channel 231 corresponding to the through-hole 221 aforementioned is changed as well. Therefore, the steps performed by the purifying element 300a, the purifying element 300b, the purifying element 300c, and the purifying element 300d can be further changed by changing the fluid flowing into the purifying element 300a, the purifying element 300b, the purifying element 300c, and the purifying element 300d.

More specifically, please refer to FIGS. 3A and 3E, when the steering valve 220 is at a position P1, the fluid WL1 for the adsorption step S1 flows into the purifying element 300a to perform the adsorption step S1; the fluid WL4 for the re-equilibration step S4 flows into the purifying element 300b to perform the re-equilibration step S4; the fluid WL3 for the elusion step S3 flows into the purifying element 300c to perform the elusion step S3; and the fluid WL2 for the washing step S2 flows into the purifying element 300d to perform the washing step S2. Please refer to FIGS. 3B and 3E, when the steering valve 220 is driven to rotate and displace to a position P2 by the first force once, the fluid WL2 for the washing step S2 flows into the purifying element 300a to perform the washing step S2; the fluid WL1 for the adsorption step S1 flows into the purifying element 300b to perform the adsorption step S1; the fluid WL4 for the re-equilibration step S4 flows into the purifying element 300c to perform the re-equilibration step S4; and the fluid WL3 for the elusion step S3 flows into the purifying element 300d to perform the elusion step S3. Please refer to FIGS. 3C and 3E, when the steering valve 220 is driven to rotate and displace to a position P3 by the first force twice, the fluid WL3 for the elusion step S3 flows into the purifying element 300a to perform the elusion step S3; the fluid WL2 for the washing step S2 flows into the purifying element 300b to perform the washing step S2; the fluid WL1 for the adsorption step S1 flows into the purifying element 300c to perform the adsorption step S1; and the fluid WL4 for the re-equilibration step S4 flows into the purifying element 300d to perform the re-equilibration step S4. Please refer to FIGS. 3D and 3E, when the steering valve 220 is driven to rotate and displace to a position P4 by the first force thrice, the fluid WL4 for the re-equilibration step S4 flows into the purifying element 300a to perform the re-equilibration step S4; the fluid WL3 for the elusion step S3 flows into the purifying element 300b to perform the elusion step S3; the fluid WL2 for the washing step S2 flows into the purifying element 300c to perform the washing step S2; and the fluid WL1 for the adsorption step S1 flows into the purifying element 300d to perform the adsorption step S1. So far, the purifying element 300a, the purifying element 300b, the purifying element 300c, and the purifying element 300d all finish a complete cycle of the protein purification process, and then the steering valve 220 will be driven by the first force again to rotate and displace to the position P1 so as to repeat the whole procedure above. Therefore, the automated continuous purification system 100 of the present disclosure can perform continuous purification without complicated operations.

In a practical test of the protein purification process, the automated continuous purification system of the present disclosure can finish five purification cycles within 180 minutes, that is, the purification process with twenty purifying elements can be finished in total. Put differently, the purification process for one purifying element only takes 9 minutes on average, which is much more efficient than the 32-minutes-per-purification-element conventional automated purification equipment. Therefore, the automated continuous purification system of the present disclosure has higher efficiency obviously. Moreover, the purity of green fluorescent proteins obtained by using the automated continuous purification system of the present disclosure to perform green fluorescent protein purification for 5 cycles is between 62% and 72%, and the recovery rate of each of the purifying elements reaches 20% to 25%. The result is comparable to the protein purity (64.56%) and the recovery rate (17.58%) of a conventional single-column purification system. Therefore, while the automated continuous purification system of the present disclosure can have a smaller overall volume of the system, a simpler operation process, and a better purification efficiency, it still keeps the purification effectiveness commensurate with the conventional purification system.

Furthermore, in FIGS. 3A to 3E, the purifying element 300a, the purifying element 300b, the purifying element 300c, and the purifying element 300d all perform the adsorption step S1, the washing step S2, the elution step S3, and the re-equilibration step S4, so as to complete the whole purification process. However, only the fluid produced in the elution step S3 contains purified proteins, so the fluid containing the purified proteins should be isolated from the fluid produced in other steps of the purification process.

Figure 4A:
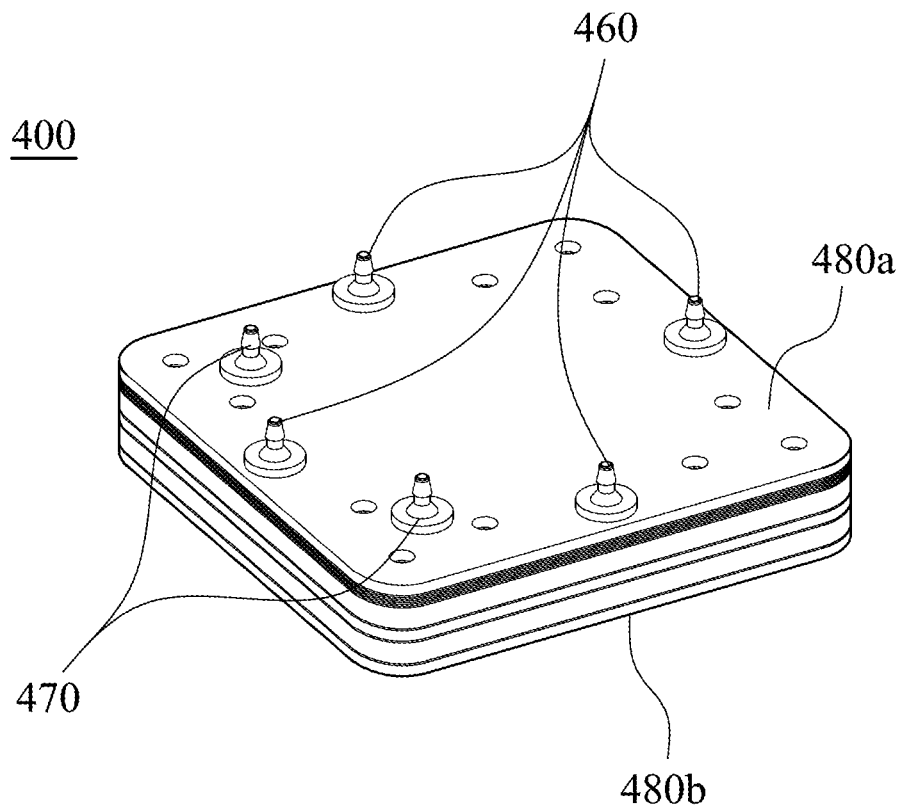
FIG. 4A is a three-dimensional view of a product classifier according to another example of one embodiment of the present disclosure.
Figure 4B:
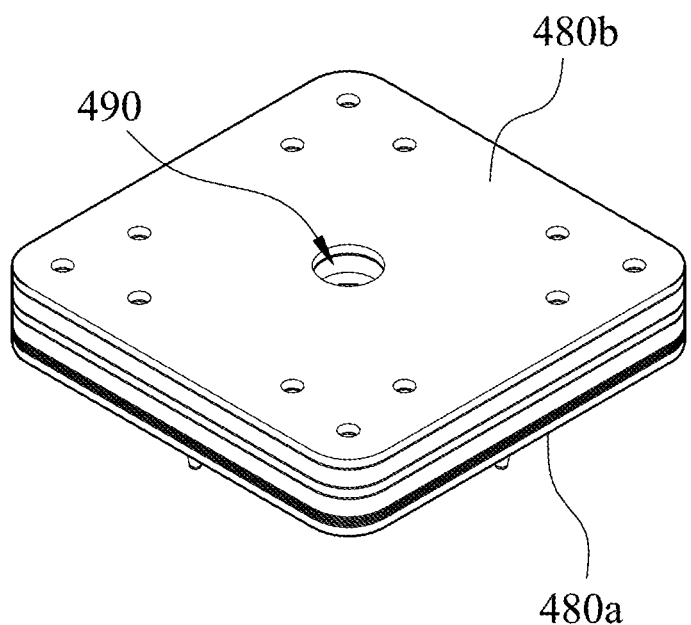
FIG. 4B is another three-dimensional view of the product classifier of the example of FIG. 4A.
Figure 4C:
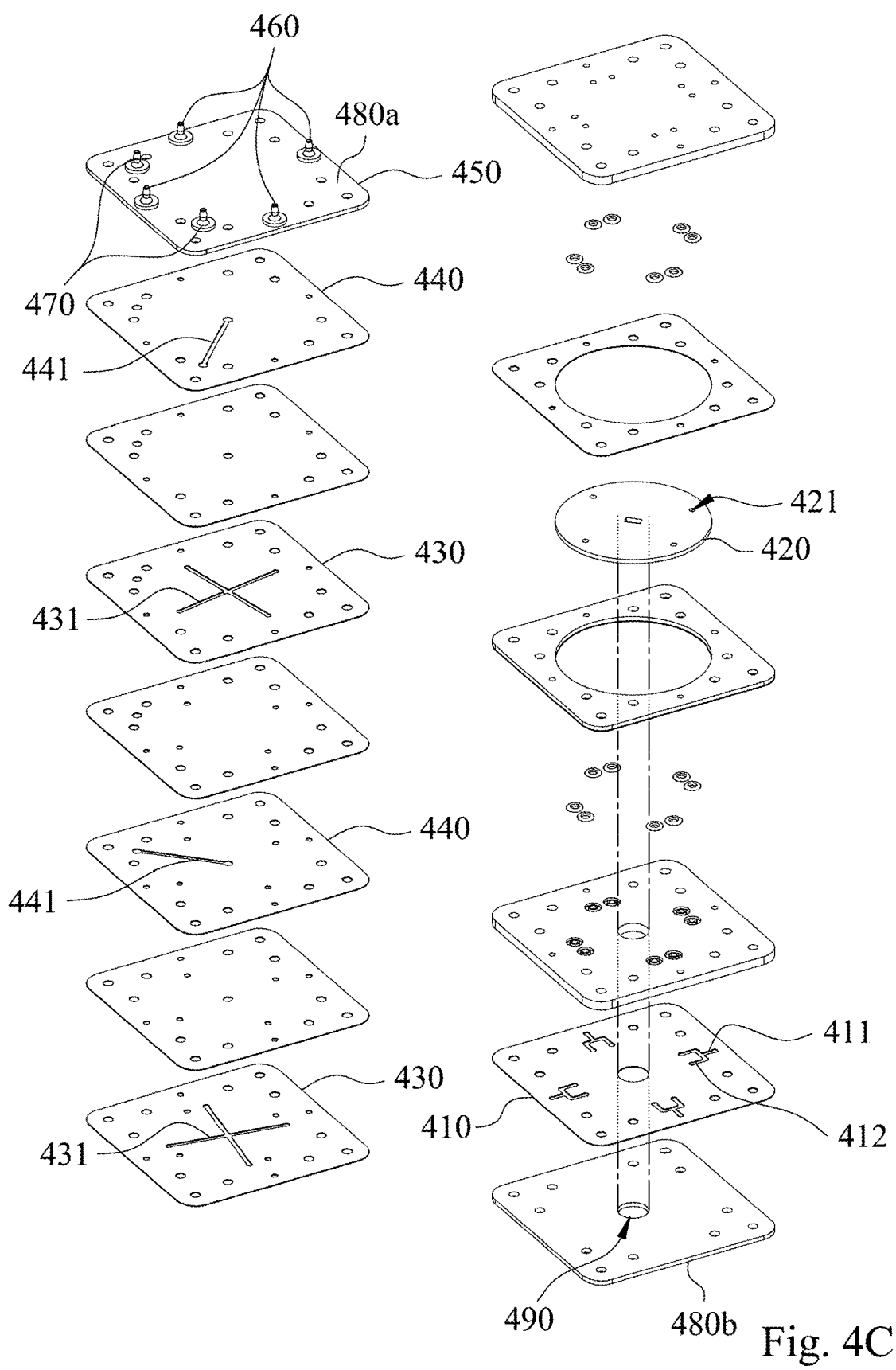
FIG. 4C is an exploded view of the product classifier of the example of FIG. 4A.

Please refer to FIGS. 4A, 4B, and 4C, FIG. 4A is a three-dimensional view of a product classifier 400 according to another example of one embodiment of the present disclosure, FIG. 4B is another three-dimensional view of the product classifier 400 of the example of FIG. 4A, and FIG. 4C is an exploded view of the product classifier 400 of the example of FIG. 4A. The automated continuous purification system 100 can further include a product classifier 400, and the product classifier 400 includes a first product flowing channel layer 410, a classification valve 420, two second product flowing channel layers 430, two third product flowing channel layers 440, and a product classifier top layer 450. The first product flowing channel layer 410 includes a plurality of first product flowing channels. The classification valve 420 is disposed on a side of the first product flowing channel layer 410, the classification valve 420 includes a plurality of classification valve holes 421, and each of the first product flowing channels 411 is communicated with one of the classification valve holes 421. The second product flowing channel layers 430 are disposed on a side of the classification valve 420 away from the first product flowing channel layer 410, each of the second product flowing channel layers 430 includes a plurality of second product flowing channels 431, and at least one of the second product flowing channels 431 of each of the second product flowing channel layers 430 is communicated with at least one of the classification valve holes 421. The third product flowing channel layers 440 are alternately stacked with the two second product flowing channel layers 430, and each of the third product flowing channel layers 440 is disposed on a side of each of the second product flowing channel layers 430 away from the classification valve 420, wherein each of the third product flowing channel layers 440 includes a third product flowing channel 441, and the third product flowing channel 441 of each of the third product flowing channel layers 440 is communicated with the second product flowing channels 431 of each of the second product flowing channel layers 430. The product classifier top layer 450 is disposed on a side of the second product flowing channel layers 430 and the third product flowing channel layers 440 away from the classification valve 420, and includes a plurality of product inlets 460 and two product outlets 470. In FIG. 4A, both the product inlets 460 and the product outlets 470 project from a surface 480a of the product classifier 400 for connecting with other elements preferably, but the present disclosure is not limited thereto. The product inlets 460 are respectively communicated with one of the first product flowing channels 411. The product outlets 470 are respectively communicated with the third product flowing channel 441 of one of the third product flowing channel layers 440. The classification valve 420 is driven to rotate and displace by a second force so that each of the classification valve holes 421 is communicated with another one of the second product flowing channels 431.

In detail, each of the product inlets 460 of the product classifier 400 can be pipe-connected to each of the purifying elements 300 so as to classify the fluid produced from each of the purifying elements 300.

More specifically, between each of the layers of the product classifier 400 can further include a plurality of water blocking elements (its reference numeral is omitted), which can be waterproof O-rings or water blocking plates with holes for preventing the fluid from leakage or flowing into a wrong flowing channel when the fluid is flowing in the product classifier 400, but the present disclosure is not limited thereto.

A surface 480b of the product classifier 400 can have a concave hole 490, and another motor (not shown) is used to connect the classification valve 420 via the concave hole 490 for providing a second force to drive the classification valve 420 to rotate and displace, but the present disclosure is not limited thereto.

In particularly, each of the first product flowing channels 411 can further include two first product flowing sub-channels 412, and each of the first product flowing channels 411 is communicated with the classification valve holes 421 of the product classifier 400 via the first product flowing sub-channels 412, so as to precisely control the fluid flow to the second product flowing channel 431 corresponding. A structure and an operating principle of the product classifier 400 are similar to the base 200. When one of the purifying elements 300 is performing an elusion step S3, the remaining purifying elements 300 are all processing another purification steps. Therefore, the user can change the positions of the classification valve holes 421 to isolate the fluid produced in the elusion step S3 from the fluids produced in other purification steps, and easily collect the fluid produced in the elusion step S3 from the different product outlets 470. Similarly, in other purification processes, the required fluids and other waste fluids can also be classified by the product classifier 400, so that the automated continuous purification system 100 can achieve the purpose of purification and classification at the same time.

To sum up, compared with a conventional automated purification equipment that needs to be installed and operated with multiple multi-directional valves to perform flowing channel switching and continuous purification, the automated continuous purification system of the present disclosure only needs to drive the steering valve by the first force to achieve the same effectiveness by the arrangement of the flowing channels and the steering valve, which enables the automated continuous purification system of the present disclosure be more straightforward in operation, and with a smaller equipment volume as well. Therefore, the automated continuous purification system of the present disclosure can be integrated into a baseplate for improving portability. Moreover, compared with the conventional automated purification equipment, the automated continuous purification system of the present disclosure has better purification efficiency, which brings about an excellent practical value in related fields as well.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An automated continuous purification system, comprising:
    a base, comprising:
        a first flowing channel layer comprising a plurality of first flowing channels;
        a steering valve disposed on a side of the first flowing channel layer, the steering valve comprising a plurality of through-holes, and each of the first flowing channels communicated with at least one of the through-holes of the steering valve;
        a plurality of second flowing channel layers disposed on a side of the steering valve away from the first flowing channel layer, wherein each of the second flowing channel layers comprises a plurality of second flowing channels, and at least one of the second flowing channels of each of the second flowing channel layers is communicated with at least one of the through-holes of the steering valve;
        a plurality of third flowing channel layers alternately stacked with the second flowing channel layers, and each of the third flowing channel layers disposed on a side of each of the second flowing channel layers away from the steering valve, wherein each of the third flowing channel layers comprises at least one third flowing channel, and the at least one third flowing channel of each of the third flowing channel layers is communicated with the second flowing channels of each of the second flowing channel layers; and
        a top layer disposed on a side of the second flowing channel layers and the third flowing channel layers away from the steering valve, and the top layer comprising:
            a plurality of inlets respectively communicated with one of the first flowing channels; and
            a plurality of outlets respectively communicated with the at least one third flowing channel of one of the third flowing channel layers; and
    a plurality of purifying elements respectively pipe-connected to one of the outlets;
    wherein the steering valve is driven to rotate and displace by a first force so that each of the through-holes is communicated with another one of the second flowing channels.

2. The automated continuous purification system of claim 1, further comprising a motor connected to the steering valve and for providing the first force.

3. The automated continuous purification system of claim 2, wherein the motor is a stepper motor.

4. The automated continuous purification system of claim 1, further comprising a plurality of fluid storage tanks, and the fluid storage tanks respectively pipe-connected to one of the inlets.

5. The automated continuous purification system of claim 4, further comprising a plurality of driving sources, and the fluid storage tanks respectively pipe-connected to one of the inlets by one of the driving sources.

6. The automated continuous purification system of claim 5, wherein each of the driving sources is a pump.

7. The automated continuous purification system of claim 6, wherein the pump is a peristaltic pump, a syringe pump, or a diagram pump.

8. The automated continuous purification system of claim 1, wherein each of the first flowing channels further comprises a plurality of first flowing sub-channels, and each of the first flowing channels is communicated with at least one of the through-holes of the steering valve via at least one of the first flowing sub-channels.

9. The automated continuous purification system of claim 8, wherein a number of the first flowing sub-channels of each of the first flowing channels, a number of the through-holes, a number of the second flowing channel layers, a number of the second flowing channels of each of the second flowing channel layers, a number of the third flowing channel layers, a number of the outlets and a number of the purifying elements are greater than or equal to a number of the inlets and a number of the first flowing channels.

10. The automated continuous purification system of claim 1, further comprising a spectrometer electrically connected to the purifying elements.

11. The automated continuous purification system of claim 1, further comprising a temperature control tank, wherein the purifying elements are accommodated in the temperature control tank.

12. The automated continuous purification system of claim 1, wherein the purifying elements are purification columns or purification multilayer membranes.

13. The automated continuous purification system of claim 1, further comprising:
  a product classifier, comprising:
    a first product flowing channel layer comprising a plurality of first product flowing channels;
    a classification valve disposed on a side of the first product flowing channel layer, the classification valve comprising a plurality of classification valve holes, and each of the first product flowing channel communicated with one of the classification valve holes;
    two second product flowing channel layers disposed on a side of the classification valve away from the first product flowing channel layer, each of the second product flowing channel layers comprising a plurality of second product flowing channels, and at least one of the second product flowing channels of each of the second product flowing channel layers communicated with at least one of the classification valve holes;
    two third product flowing channel layers alternately stacked with the two second product flowing channel layers, and each of the third product flowing channel layers disposed on a side of each of the second product flowing channel layers away from the classification valve, wherein each of the third product flowing channel layers comprises a third product flowing channel, and the third product flowing channel of each of the third product flowing channel layers is communicated with the second product flowing channels of each of the second product flowing channel layers; and
    a product classifier top layer disposed on a side of the second product flowing channel layers and the third product flowing channel layers away from the classification valve, comprising:
      a plurality of product inlets respectively communicated with one of the first product flowing channels; and
      two product outlets respectively communicated with the third product flowing channel of one of the third product flowing channel layers;
  wherein the classification valve is driven to rotate and displace by a second force so that each of the classification valve holes is communicated with another one of the second product flowing channels.

* * * * *